US010255100B2

(12) United States Patent
Frazier et al.

(10) Patent No.: US 10,255,100 B2
(45) Date of Patent: *Apr. 9, 2019

(54) PERFORMANCE OPTIMIZATION ENGINE FOR PROCESSOR PARAMETER ADJUSTMENT

(71) Applicant: International Business Machines Corporation, Armonk, NY (US)

(72) Inventors: Giles R. Frazier, Austin, TX (US); Michael Karl Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 451 days.

This patent is subject to a terminal disclaimer.

(21) Appl. No.: 14/958,153

(22) Filed: Dec. 3, 2015

(65) Prior Publication Data

US 2017/0161093 A1 Jun. 8, 2017

(51) Int. Cl.
| | |
|---|---|
| *G06F 9/46* | (2006.01) |
| *G06F 9/30* | (2018.01) |
| *G06F 9/455* | (2018.01) |
| *G06F 11/30* | (2006.01) |
| *G06F 9/445* | (2018.01) |
| *G06F 9/50* | (2006.01) |

(52) U.S. Cl.
CPC .......... *G06F 9/46* (2013.01); *G06F 9/30* (2013.01); *G06F 9/45533* (2013.01); *G06F 11/3037* (2013.01); *G06F 9/44505* (2013.01); *G06F 9/5016* (2013.01); *G06F 2009/45583* (2013.01)

(58) Field of Classification Search
None
See application file for complete search history.

(56) References Cited

U.S. PATENT DOCUMENTS 7,318,222 B2 * 1/2008 Civlin ............... G06F 9/45525
 711/128
7,448,037 B2 * 11/2008 Arimilli ............ G06F 9/5011
 712/216

(Continued)

OTHER PUBLICATIONS

Giles R. Frazier, et al.,"Application-Level Initiation of Processor Parameter Adjustment", U.S. Appl. No. 14/958,148, filed Dec. 3, 2015.

(Continued)

*Primary Examiner* — Eric Coleman
(74) *Attorney, Agent, or Firm* — Cantor Colburn LLP; Steven Chiu (57) ABSTRACT

A method for processor parameter adjustment using a performance optimization engine is provided. An aspect includes receiving, by the performance optimization engine comprising a hardware module in a processor of a computer system, a request to adjust an operating parameter of the processor from software that is executing on the computer system. Another aspect includes determining an adjusted value for the operating parameter by the performance optimization engine during execution of the software. Another aspect includes setting the operating parameter to the adjusted value in a parameter register of the processor. Yet another aspect includes executing the software according to the parameter register by the processor.

15 Claims, 4 Drawing Sheets

(56) References Cited

U.S. PATENT DOCUMENTS

| | | | |
|---|---|---|---|
| 8,104,038 B1 | 1/2012 | Graupner | |
| 8,327,126 B2 | 12/2012 | Bell, Jr. et al. | |
| 8,756,582 B2 | 6/2014 | Serrano | |
| 9,436,493 B1* | 9/2016 | Thomas | G06F 21/53 |
| 9,459,685 B1* | 10/2016 | Flikkema | G06F 1/3206 |
| 9,880,868 B2* | 1/2018 | Shah | G06F 9/45558 |
| 2006/0224872 A1* | 10/2006 | Shihadeh | G06F 9/3848 712/239 |
| 2007/0050661 A1 | 3/2007 | Ferren et al. | |
| 2009/0113442 A1 | 4/2009 | Deidda et al. | |
| 2010/0191936 A1* | 7/2010 | Khatri | G06F 1/3203 712/42 |
| 2011/0023029 A1* | 1/2011 | Diab | G06F 9/5077 718/1 |
| 2011/0167245 A1 | 7/2011 | Lavrov et al. | |
| 2014/0136823 A1 | 5/2014 | Ragland et al. | |
| 2014/0359269 A1 | 12/2014 | Moen et al. | |
| 2015/0089204 A1 | 3/2015 | Henry et al. | |
| 2015/0205588 A1* | 7/2015 | Bates | G06F 9/4552 717/145 |

OTHER PUBLICATIONS

IBM; "Automated Computer Performance Model Calibration Method Using Rule Based Inferencing and Generate-And-Test Pardigm"; ip.com; ip.com No. 000100543; p. 1-4; Mar. 15, 2005.

IBM; "Automated Iterative Method to Identify Functional Critical Paths in High Performance Processors"; ip.com; ip.com No. 000134933; p. 1-3; Mar. 3, 2006.

IBM; "Event-Based Branch Facility [Category Served]"; PowerISA Version 2.047B; Book II, Chapter 7; p. 817-820; Apr. 9, 2015.

IBM; "Performance Monitor Facility"; PowerISA Version 2.047B; Book III, Chapter 9; p. 983-1002; Apr. 9, 2015.

Jonathan D. Bradbury, et al.; "Fingerprint-Based Processor Parameter Management"; U.S. Appl. No. 14/958,142, filed Dec. 3, 2015.

List of IBM Patents or Patent Applications Treated as Related—Date Filed: Mar. 3, 2016; 1 page.

Giles R. Frazier, et al., "Application-Level Processor Parameter Management", U.S. Appl. No. 14/958,151, filed Dec. 3, 2015.

* cited by examiner

PERFORMANCE OPTIMIZATION ENGINE FOR PROCESSOR PARAMETER ADJUSTMENT

BACKGROUND

The present invention relates generally to computer processors, and more specifically, to a performance optimization engine for processor parameter adjustment.

One of the functions of a managed run-time environment is processor performance optimization. Optimization typically involves compiling code so as to provide optimal processor performance for the current workload and hardware. Such code optimization may significantly improve processor performance during execution of the code. Processor performance may be further increased by adjustment of the hardware configuration and/or operating parameters of a processor to fit a specific workload. However, a hypervisor or operating system (OS), which may have access to the operating parameters of the processor, may have no knowledge of the actual current runtime environment workload.

SUMMARY

Embodiments include a method, system, and computer program product for processor parameter adjustment using a performance optimization engine. An aspect includes receiving, by the performance optimization engine comprising a hardware module in a processor of a computer system, a request to adjust an operating parameter of the processor from software that is executing on the computer system. Another aspect includes determining an adjusted value for the operating parameter by the performance optimization engine during execution of the software. Another aspect includes setting the operating parameter to the adjusted value in a parameter register of the processor. Yet another aspect includes executing the software according to the parameter register by the processor.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of a performance optimization engine for processor parameter adjustment are provided, with exemplary embodiments being discussed below in detail. The performance optimization engine comprises a hardware control system that monitors processor performance while an application executes, and makes adjustments to processor parameters to fit the current task based on the measured performance. By performing such task-specific adjustments, processor performance may be improved. Optimized values for the processor parameters that are being adjusted are determined in the background while the requesting software is being executed.

Processor parameters may be stored in one or more registers in the processor. In some embodiments, such a register may be referred to as a workload optimization register (WOR). The WOR is written into by the hypervisor to set processor parameters. In some embodiments, additional registers holding values for additional control parameters may also be included in the processor. Processor parameters that may be stored in a WOR include, but are not limited to, the branch history algorithm, branch history depth, the cache data prefetch depth, whether to enable store-hit-load prevention, whether to route all fixed-point operations to the fixed point unit (FXU), whether to route all loads to the load unit (not the load store unit), the instruction prefetch depth, and the store gather window. The performance optimization engine may adjust one of more of these processor parameters to fit a current application's workload.

The adjustments to the processor parameters may be made based on software-specified performance targets that are provided in a call to the performance optimization engine in some embodiments. The performance targets may be indicated in the call by the application that is currently running on the processor. If a specified target cannot be met by the performance optimization engine, the requesting software is notified. In an example, an application may issue an "Optimize_prefetch" instruction to the processor that has two inputs, such as: Optimize_prefetch (target_data_prefetch_rate, tolerance). This instruction directs the performance optimization engine to constantly monitor the data prefetch hit rate in the processor, and adjust the data prefetch depth so as to maintain the specified target_data_prefetch_rate within a specified tolerance. In order to terminate the parameter adjustment process, the application may issue a stop command to the processor, such as: Stop_optimizing_prefetch( ). In some embodiments, the Stop_optimizing( ) command may set any processor parameters that were adjusted back to default values. In various embodiments, any appropriate parameter may be adjusted, including but not limited to the branch history depth, the prefetch depth for multiple data cache levels, and/or the instruction prefetch depth.

Figure 1:
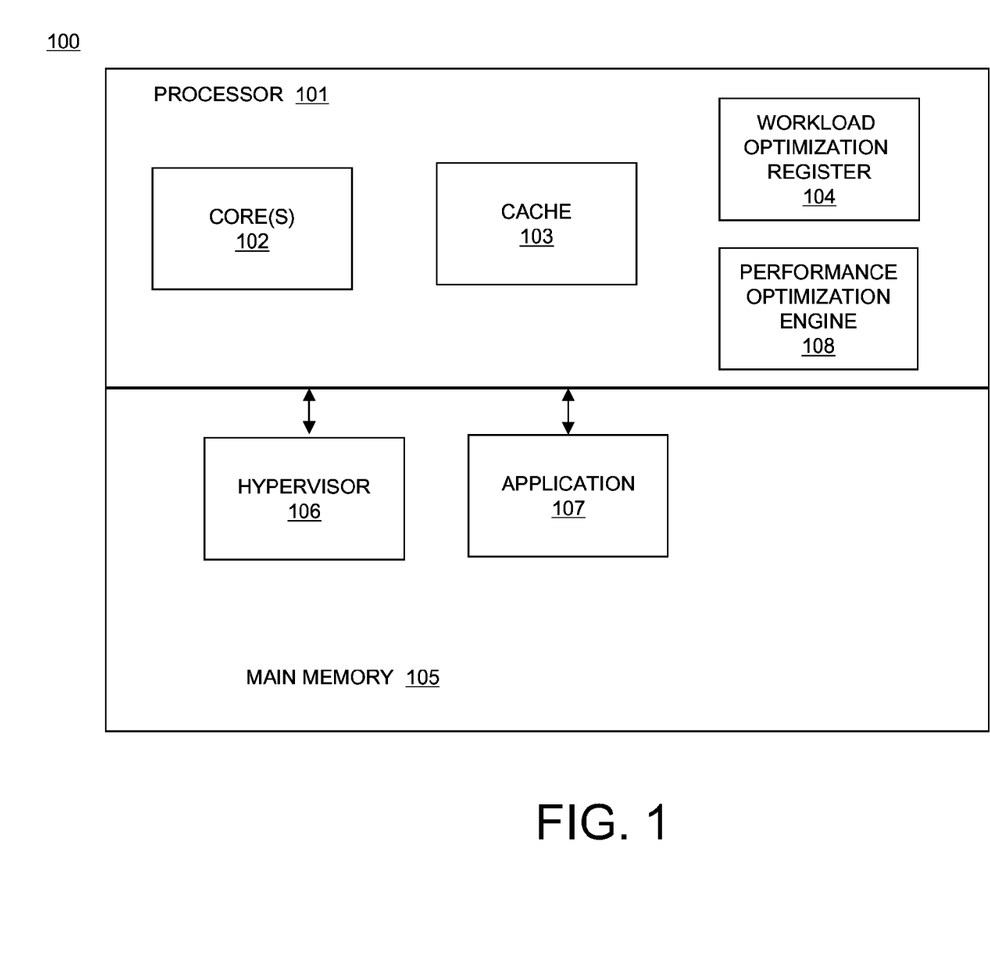
FIG. 1 depicts a computer system including a performance optimization engine for processor parameter adjustment in accordance with an embodiment.

FIG. 1 depicts a computer system including a performance optimization engine for processor parameter adjustment in accordance with an embodiment. Computer system 100 includes a processor 101 in communication with a main memory 105. The processor 101 includes one or more cores 102 that execute instructions using cache memory 103. Processor 101 further includes a WOR 104, which holds various parameters that dictates the functioning of the processor 101. Parameters that are stored in WOR 104 may include any of, but are not limited to, the branch history algorithm, branch history depth, the cache data prefetch depth, whether to enable store-hit-load prevention, whether to rout all fixed-point operations to the fixed point unit (FXU), whether to rout all loads to the load unit (not the load store unit), the instruction prefetch depth, and the store gather window. Computer programs, such as hypervisor 106 and application 107, are stored in main memory 105 and executed by the processor 101. Any appropriate number of applications may be executed by a computer system such as computer system 100. Software, such as hypervisor 106 or application 107, may issue a request to the performance optimization engine 108 in the processor 101 to update the parameters in WOR 104. Performance optimization engine 108 comprises a hardware engine that is located in processor 101. Performance optimization engine 108 determines new parameters for WOR 104 that match a current workload of processor 101 based on a received request from hypervisor 106 or application 107, and may continuously monitor the performance of processor 101 and update the parameters in WOR 104 based on performance targets provided in the request until a stop command is received.

Figure 2:
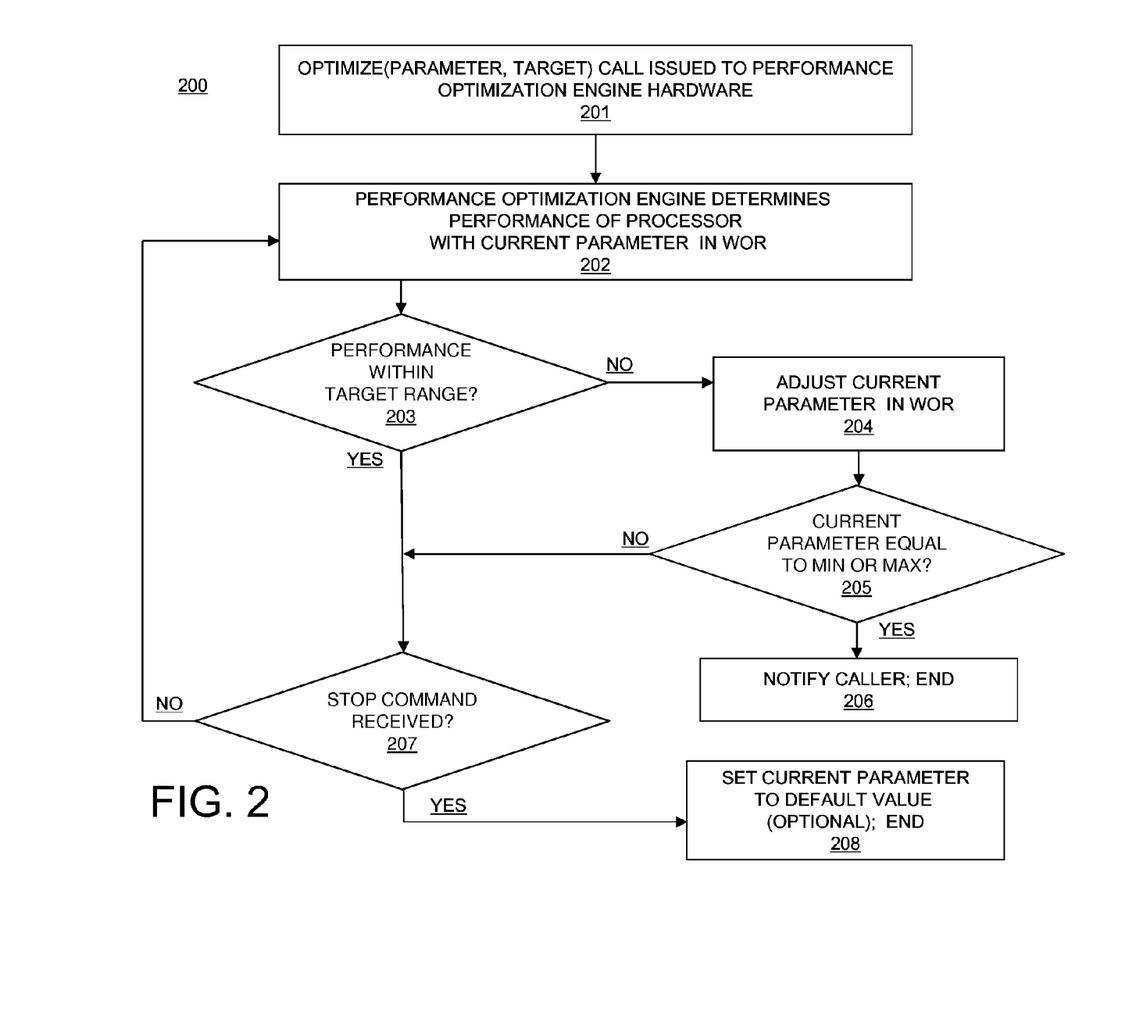
FIG. 2 depicts a process flow for parameter adjustment by a performance optimization engine in accordance with an embodiment.

FIG. 2 depicts a method 200 for a parameter adjustment by a performance optimization engine in accordance with an embodiment. Method 200 may be implemented in performance optimization engine 108. Method 200 illustrates adjustment of a single parameter; however, in various embodiments of parameter adjustment, multiple parameters may be adjusted simultaneously using method 200 based on respective target ranges. First, in block 201, software that is running on the computer system 100 issues a request to adjust a current parameter to the performance optimization engine 108. In some embodiments, only a hypervisor 106 or operating system may issue a request to adjust an operating parameter; in other embodiments, less privileged software such as application 107 may issue the request. The request includes a specification of the particular current parameter and a target performance range (e.g., OPTIMIZE (PARAM, TARGET_PERF_RANGE)). Next, in block 202, the performance optimization engine 108 determines the current performance of the processor 101 with the current value of the parameter that is being adjusted. In some embodiments, the performance optimization engine 108 may utilize a timeout counter, and, while the timeout counter is counting, measure the current performance of the processor 101 while the requesting software is executing. In block 203, it is determined whether the measured performance that was determined in block 202 is within the target performance range. If it is determined in block 203 that the measured performance is not within the target performance range, flow proceeds to block 204, and the current parameter is adjusted in the WOR 104 based on the target performance range and the measured performance. The current parameter may be adjusted up or down by any appropriate amount in block 204. Flow proceeds from block 204 to block 205. In block 205, it is determined whether the current parameter is has been adjusted to a minimum or a maximum possible value for the current parameter without achieving the desired performance. If it is determined in block 205 that the current parameter is equal to a minimum or maximum value without achieving the desired performance, the requesting software is notified that the desired performance cannot be achieved by adjusting the current parameter in block 206, and method 200 ends.

If it was determined in block 203 that the measured performance is within the target performance range, flow proceeds directly from block 203 to block 207, and the value of the current parameter is not adjusted. In block 207, it is determined whether a stop command has been received from the requesting software by the performance optimization engine 108. If it is determined in block 207 that a stop command has not been received, flow returns to block 202 from block 207, and the current performance is again determined. The monitoring of the processor performance and adjustment of the current parameter as needed, as is performed in blocks 202, 203, and 204, are repeated until it is determined in block 205 that the current parameter is equal to the minimum or maximum value, or until it is determined in block 207 that the stop command has been received, at which point flow proceeds from block 207 to block 208. In block 208, in some embodiments, the current parameter that was adjusted is set back to a default value in the WOR 104, and method 200 ends. In other embodiments, the current parameter is left at the adjusted value in block 208, and method 200 ends.

Figure 3:
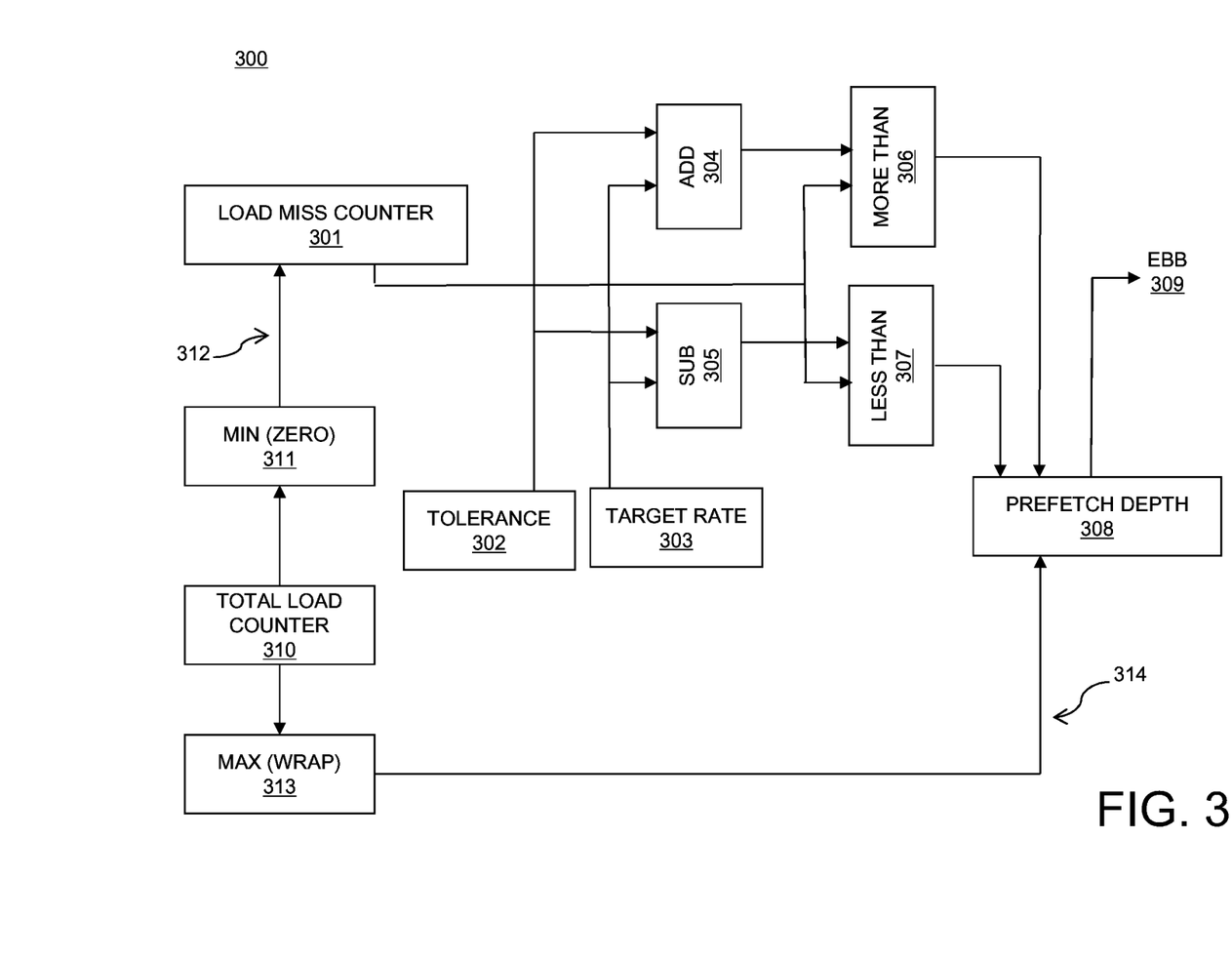
FIG. 3 depicts a performance optimization engine for processor parameter adjustment in accordance with an embodiment.

FIG. 3 depicts an embodiment of a performance optimization engine 300, which may comprise performance optimization engine 108 of FIG. 1. Performance optimization engine 300 comprises a load miss counter 301 that counts load misses that occur in cache 103 of processor 101. The performance optimization engine is initialized with a target load miss rate 303, and a tolerance 302 that gives a range of acceptable load miss rates. Adder 304 adds the tolerance 302 to the value of the load miss counter 301, and outputs the sum to less than determination module 307. Subtractor 305 subtracts the tolerance 302 from the value of the load miss counter 301, and outputs the difference to more than determination module 306. Less than determination module 307 and more than determination module 306 determine whether the load miss counter 301 is within the tolerance 302 of the target load miss rate 303. If it is determined by less than determination module 307 that the load miss counter 301 plus the tolerance 302 is less than the target load miss rate 303 (i.e., is below the desired range), the prefetch depth 308 is lowered. If it is determined by more than determination module 306 that the load miss counter 301 minus the tolerance 302 is more than the target load miss rate 303 (i.e., above the desired range), the prefetch depth 308 is raised. The raising or lowering of the prefetch depth 308 may be by a predetermined amount, and is performed based on receipt of wrap signal 314, which is output from wrap indicator 313 whenever the total load counter 310 reaches its maximum value. For example, the total load counter 310 may be an 8-bit counter that wraps every 256 load instructions, in which case the target load miss rate 303 and tolerance 302 may be specified in terms of load instruction prefetch misses per 256 load instructions. Total load counter 310 also resets load miss counter 301 via reset signal 312 whenever the total load counter 310 reaches its minimum value (i.e. zero) via wrap indicator 311. If the value of the prefetch depth 308 is ever incremented to a maximum value or decremented to a minimum value, the target performance rate cannot be achieved, and an event based branch (EBB) 309 is initiated in order to enable software to terminate the process and optionally take other steps in order to cause the miss rate to be within the desired tolerance. FIG. 3 is shown for illustrative purposes only; a performance optimization engine such as is shown in FIG. 3 may optimize any appropriate processor parameter and may, in some embodiments, simultaneously optimize multiple processor parameters.

Figure 4:
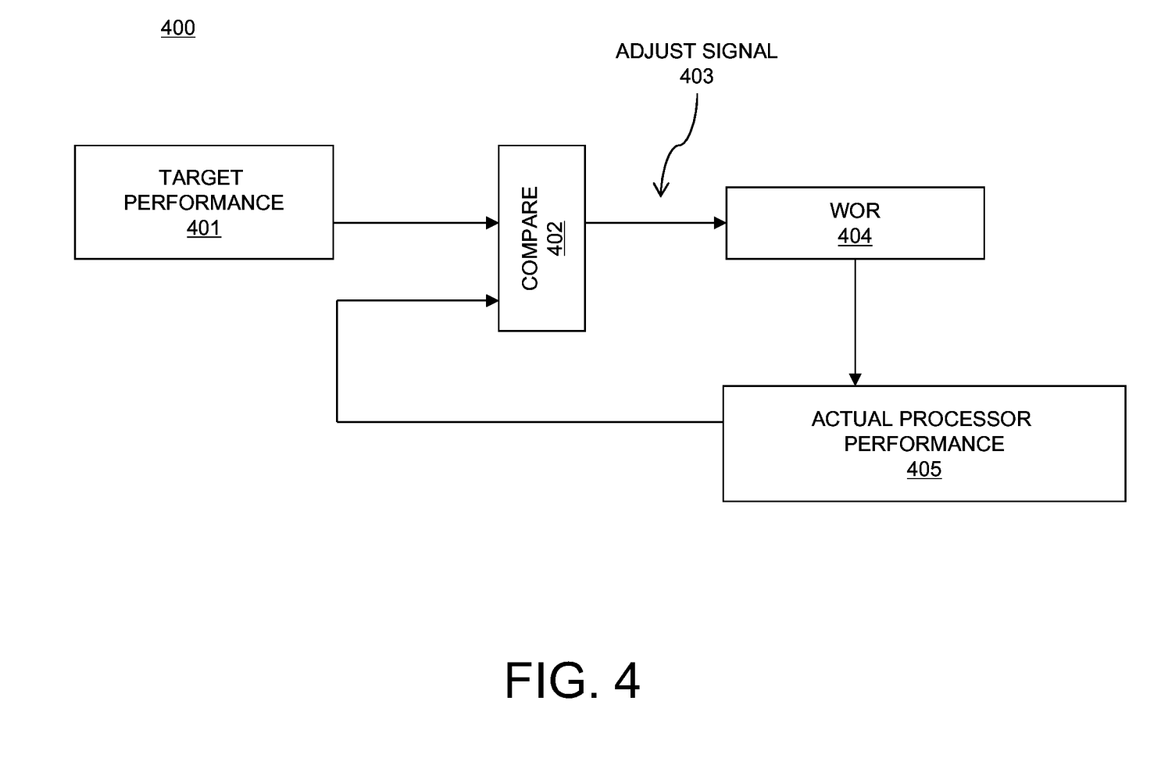
FIG. 4 depicts a performance optimization engine for processor parameter adjustment in accordance with an embodiment.

FIG. 4 depicts another embodiment of a performance optimization engine 400, which may comprise performance optimization engine 108 of FIG. 1. Performance optimization engine 400 includes a target performance 401, which is compared by compare module 402 to the actual processor performance 405. Based on the comparison, an adjust signal 403, which may increment or decrement the parameter that is currently being adjusted, is provided to WOR 404 (which may correspond to WOR 104 of FIG. 1). For example, the target performance 401 may be a target data cache hit rate in cache 103 plus or minus a tolerance, that is compared by compare module 402 with the actual data cache hit rate that is given by actual processor performance 405. If the actual processor performance 405 is above the target range, the corresponding processor configuration parameter in WOR 404 is adjusted so as to decrease the data cache hit rate. For example, if the data cache hit rate is higher than desired, data cache prefetch depth may be decreased in WOR 404. Similarly, if the actual processor performance 405 is below the target range, the data cache prefetch depth may be increased in the WOR 404. FIG. 4 is shown for illustrative purposes only; a performance optimization engine such as is shown in FIG. 4 may optimize any appropriate processor parameter and may, in some embodiments, simultaneously optimize multiple processor parameters.

Some embodiments may also use the hardware shown in FIGS. 3 and/or 4 to adjust any processor configuration parameter, including those for which the relationship between the output variable and the configuration parameter is unknown. For example, if it is unknown whether a change to a parameter will cause the processor performance to increase or decrease, the parameter can be adjusted in a default direction. If that adjustment does not bring the actual performance into the target range, then the next value of the parameter can be chosen until the target performance is within the target range. If the target performance is not achieved after all values of the configuration parameter have been attempted, an EBB or other lightweight interrupt occurs to alert software that the target performance is unachievable. In further embodiments, a computer system 100 may include a plurality of different performance optimization engines 108, which may correspond to different respective parameters in WOR 104.

Technical effects and benefits include improved performance in a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for processor parameter adjustment using a performance optimization engine, the method comprising:
    receiving, by the performance optimization engine comprising a hardware module in a processor of a computer system, a request to adjust an operating parameter of the processor from software that is executing on the computer system, wherein the request comprises a target performance range for the processor;
    determining an adjusted value for the operating parameter by the performance optimization engine during execution of the software;
    setting the operating parameter to the adjusted value in a parameter register of the processor;
    executing the software according to the parameter register by the processor; and
    performing, by the performance optimization engine:
        determining a current performance of the processor;
        determining whether the current performance is within the target performance range;
        based on determining that the current performance is not within the target performance range, adjusting the operating parameter in the parameter register;
        determining whether the adjusted operating parameter is to a minimum value or a maximum value of the operating parameter; and
        based on determining that the adjusted operating parameter is equal to the minimum value or maximum value of the operating parameter, notifying the software that the target performance range cannot be achieved.

2. The method of claim 1, wherein the software comprises a hypervisor.

3. The method of claim 1, wherein the software comprises an application.

4. The method of claim 1, further comprising repeating the determining of the current performance, determining whether the current performance is within the target performance range, and based on determining that the current performance is not within the target performance range, adjusting the operating parameter in the parameter register, during execution of the software until a command to stop adjusting the operating parameter is received by the performance optimization engine from the software.

5. The method of claim 4, further comprising adjusting the operating parameter to a default value in the parameter register based on receiving the command to stop adjusting the operating parameter.

6. A computer program product for implementing processor parameter adjustment using a performance optimization engine, the computer program product comprising a computer readable storage medium having program instructions embodied therewith, the program instructions readable by a processing circuit to cause the processing circuit to perform a method, the method comprising:
    receiving, by a performance optimization engine comprising a hardware module in a processor of a computer system, a request to adjust an operating parameter of the processor from software that is executing on the computer system, wherein the request comprises a target performance rang for the processor;
    determining an adjusted value for the operating parameter by the performance optimization engine during execution of the software;
    setting the operating parameter to the adjusted value in a parameter register of the processor;
    executing the software according to the parameter register by the processor; and
    performing, by the performance optimization engine:
        determining a current performance of the processor;
        determining whether the current performance is within the target performance range;
        based on determining that the current performance is not within the target performance range, adjusting the operating parameter in the parameter register;
        determining whether the adjusted operating parameter is equal to a minimum value or a maximum value of the operating parameter; and
        based on determining that the adjusted operating parameter is equal to the minimum value or maximum value of the operating parameter, notifying the software that the target performance range cannot be achieved.

7. The computer program product of claim 6, wherein the software comprises a hypervisor.

8. The computer program product of claim 6, wherein the software comprises an application.

9. The computer program product of claim 6, the method further comprising repeating the determining of the current performance, determining whether the current performance is within the target performance range, and based on determining that the current performance is not within the target performance range, adjusting the operating parameter in the parameter register, during execution of the software until a command to stop adjusting the operating parameter is received by the performance optimization engine from the software.

10. The computer program product of claim 9, the method further comprising adjusting the operating parameter to a default value in the parameter register based on receiving the command to stop adjusting the operating parameter.

11. A computer system for processor parameter adjustment using a performance optimization engine, the system comprising:
   a memory; and
   a processor, communicatively coupled to said memory, the computer system configured to perform a method comprising:
      receiving, by the performance optimization engine comprising a hardware module in the processor of the computer system, a request to adjust an operating parameter of the processor from software that is executing on the computer system, wherein the request comprises a target performance range for the processor;
      determining an adjusted value for the operating parameter by the performance optimization engine during execution of the software;
      setting the operating parameter to the adjusted value in a parameter register of the processor;
      executing the software according to the parameter register by the processor; and
      performing, by the performance optimization engine:
         determining a current performance of the processor;
         determining whether the current performance is within the target performance range;
         based on determining that the current performance is not within the target performance range, adjusting the operating parameter in the parameter register;
         determining whether the adjusted operating parameter is equal to a minimum value or a maximum value of the operating parameter; and
         based on determining that the adjusted operating parameter is equal to the minimum value or maximum value of the operating parameter, notifying the software that the target performance range cannot be achieved.

12. The computer system of claim 11, wherein the software comprises a hypervisor.

13. The computer system of claim 11, wherein the software comprises an application.

14. The computer system of claim 11, the method further comprising repeating the determining of the current performance, determining whether the current performance is within the target performance range, and based on determining that the current performance is not within the target performance range, adjusting the operating parameter in the parameter register, during execution of the software until a command to stop adjusting the operating parameter is received by the performance optimization engine from the software.

15. The computer system of claim 14, the method further comprising adjusting the operating parameter to a default value in the parameter register based on receiving the command to stop adjusting the operating parameter.

* * * * *